United States Patent [19]
Weaver

[11] 3,874,524
[45] Apr. 1, 1975

[54] APPARATUS FOR DISCHARGING SILAGE FROM A SILO

[76] Inventor: Richard L. Weaver, Rt. 1, Myerstown, Pa. 17067

[22] Filed: Apr. 26, 1973

[21] Appl. No.: 354,496

Related U.S. Application Data

[63] Continuation-in-part of Ser. No. 218,736, Jan. 18, 1972, , and a continuation-in-part of Ser. No. 283,384, Aug. 24, 1972, Pat. No. 3,817,409.

[52] U.S. Cl. .......................................... 214/17 DA
[51] Int. Cl. ............................................ B65g 65/46
[58] Field of Search ......... 214/17 DA, 17 D, 17 DB

[56] References Cited
UNITED STATES PATENTS

| | | | |
|---|---|---|---|
| 2,746,617 | 5/1956 | Borrowdale | 214/17 DA |
| 3,275,168 | 9/1966 | Schleich | 214/17 DA |
| 3,374,906 | 3/1968 | Zimmerman | 214/17 DA |
| 3,426,924 | 2/1969 | Ferris | 214/17 DA |

FOREIGN PATENTS OR APPLICATIONS

| | | | |
|---|---|---|---|
| 1,271,039 | 6/1968 | Germany | 214/17 DA |

*Primary Examiner*—Robert G. Sheridan
*Attorney, Agent, or Firm*—Paul & Paul

[57] ABSTRACT

Apparatus is provided, of the auger type, for the disposition at the bottom of a silo, for sweeping across the floor of a silo while rotating on its own axis, and for conveying silage from the bottom of the silo to a generally central opening. Particularly novel means is provided for cutting and discharging of silage that is disposed up against the silo wall. The silage is delivered to a generally central opening in the silo, and a particularly novel discharge chute or duct with a bottom seal therefor provides a method for discharging silage into a tunnel disposed beneath the silo, on a selective basis.

15 Claims, 5 Drawing Figures

3,874,524

APPARATUS FOR DISCHARGING SILAGE FROM A SILO

CROSS-REFERENCE TO RELATED APPLICATIONS

This is continuation-in-part of application Ser. No. 218,736, filed Jan. 18, 1972, and of application Ser. No. 283,384, filed Aug. 24, 1972, now U.S. Pat. No. 3,817,409.

BACKGROUND OF THE INVENTION

Storage silos for the storage of grain, feed and the like can be either of the top unloader type, or bottom unloader type. It is often preferred to utilize silos of the bottom unloader type, in that, by withdrawing silage from the bottom of the silo, the oldest silage is utilized first, as well as for many other reasons. The present invention is directed toward bottom unloaders for silos.

Bottom unloaders have also been developed in the past, but difficulties with such unloaders have very often been experienced, in that the tremendous weight of silage upon the bottom unloaders often compact silage about the unloaders, acting as a brake, and jamming the operation of the unloader.

Particularly, when the unloader is of the auger type, with teeth of other suitable cutting devices for cutting silage as an auger is rotated about its axis, and for propelling or otherwise conveying silage thus cut, to a generally central location, it is also necessary to move such an auger across the floor of a silo.

If such an auger is of a radial type, adapted for a sweeping motion about a center, for example, of a generally cylindrical silo, such may sweep across the floor of the silo, cutting a path, with silage from an upper part of the silo then falling downwardly into the zone previously traversed by the auger.

It has been found that such augers must be constructed in such a manner as to withstand tremendous silage forces.

Also, there is present the problem of how to drive the auger in its sweeping motion. Some systems have been developed, whereby a motor or the like may be mounted at a radial outermost end of an auger for driving a member which in turn, is engagable with another member at the periphery of the silo floor, or inside the silo wall. However, if a motor of the like is adapted for movement with the auger about the silo, in its sweeping action, should the auger become jammed, it may be exceedingly difficult, if not impossible to service the motor.

Additionally, in prior art types of devices, and even in the devices of my own prior applications set forth above, in order to remove the silage that is disposed up close against the silo wall, the use of auxiliary augers has been required. This is because, in making its initial sweep across the floor of a silo, it has been found that it is first desirable to make an initial dome-like structure, by the use of an auger that has a radial outermost end that is spaced considerably from the silo wall. Also, by making an initial sweep that is somewhat shortened or spaced from the silo wall, as measured radially, less resistance to the advance of the auger is encountered. On subsequent passes, auxiliary augers have been placed on the outer ends of the augers, a practice which requires a certain amount of time and inconvenience, in necessitating the replacement of different sized augers, or even just in the placement of a single auxiliary auger at the end of the auger. Also, other types of cutters have been utilized, but such also require discontinuance of the use of the auger so that the changes may be made in the outer end of the auger in order that the auger may then approach more closely the silo wall, in a subsequent sweep or advancing motion.

Prior art types of devices have also not in all instances provided adequate facilities for discharge of silage, after the silage is delivered to a generally centrally disposed bottom opening thereof.

THE PRESENT INVENTION

The present invention is addressed to the provision of an auger type bottom discharge, that moves in a sweeping motion across the silo floor, and wherein means is provided for enabling the auger to approach the silo wall, to the extent desired, without interrupting the operation for replacement or changing of parts and the like.

Accordingly, it is an object of this invention to provide a novel silo unloader apparatus.

It is a further object of this invention to provide a novel means of removing silage from closely adjacent a silo wall.

It is a further object of this invention, to provide a novel mechanism that utilizes an auger that is movable radially between positions further away from and more closely adjacent a silo wall, as desired.

It is a further object of this invention to monitor the movement of an auger as discussed in the objects set forth immediately above.

It is another object of this invention to provide, in conjunction with a silo, a novel apparatus for the unloading of silage therefrom.

It is a further object of this invention to provide novel discharge means for silage, after delivery thereof to a generally centrally disposed location.

It is a further object of this invention to provide a novel overall silo construction as it relates to the discharge of silage therefrom, through the bottom thereof, wherein particularly novel discharge means is provided.

It is another object of this invention to provide a novel silage discharge means having sealing means at the discharge opening thereof, for optional opening and closing when desired.

Other objects and advantages of the present invention will be readily apparent to those skilled in the art from a reading of the following brief descriptions of the drawings figures, detailed descriptions of the preferred embodiment, and the appended claims.

In the drawings:

FIG. 1 is a top plan view of the lower end of the silo unloading apparatus of this invention, with the view being taken in a horizontal section through a silo, and with a silage discharge tunnel being shown in dotted lines beneath the silo.

FIG. 2 is an enlarged vertical sectional view, taken through a portion of the silo and apparatus illustrated in FIG. 1, generally along the line II—II of FIG. 1, with the illustration being shortened for the sake of clarity, with radial inward and outward positions of the auger being illustrated in full line and phantom positions, respectively, and with the discharge opening at the center of the silo, and the pivotal sealing closure therefor being illustrated also.

Figures 1, 4:
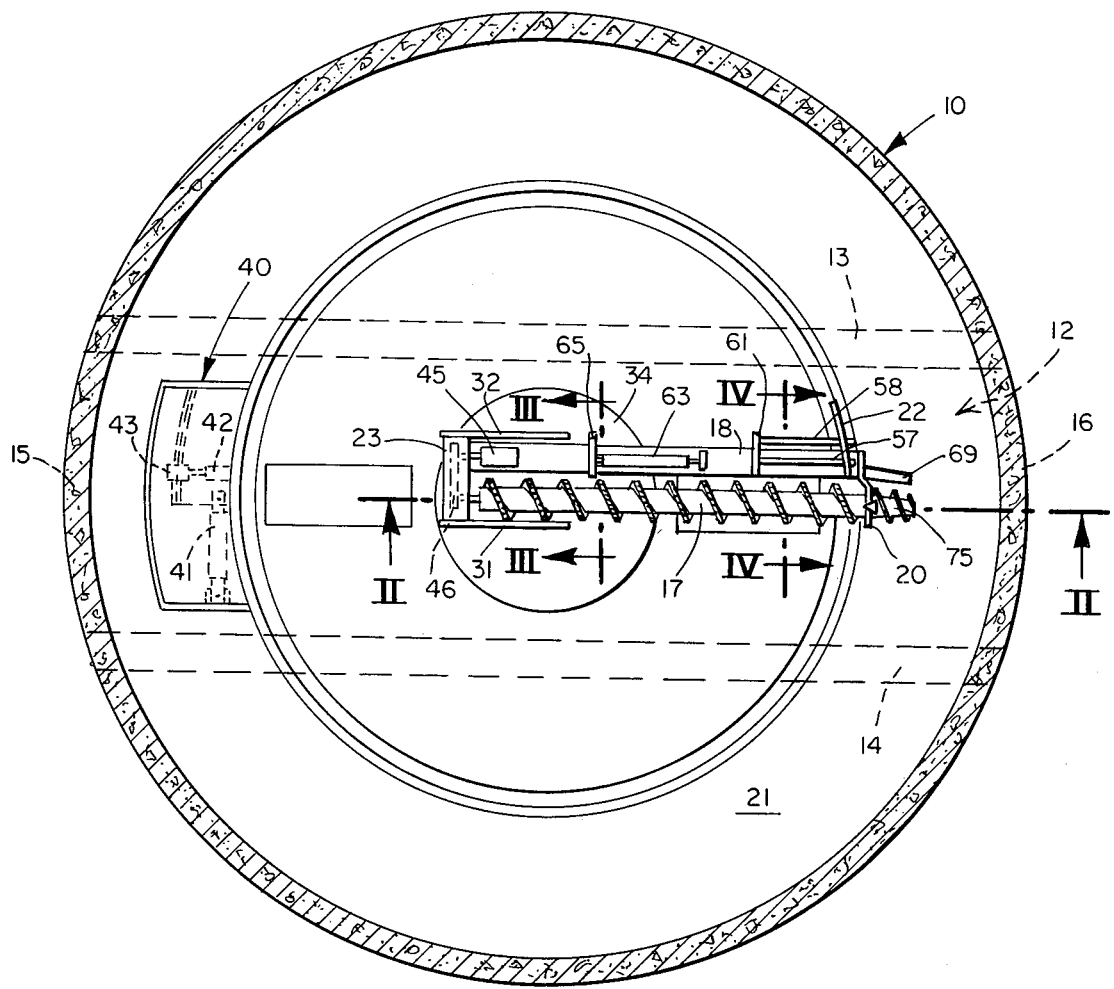
FIG. 4 is an enlarged fragmentary transverse sectional view, taken through the auger and support arm therefor, generally along the line IV—IV of FIG. 1, wherein the supporting means for supporting the outer end of the auger is illustrated, as comprising a circular band in a track and an upstanding support connected to the band.

Referring now to the drawings in detail, reference is made first to FIG. 1 wherein there is illustrated a silo generally designated by the numeral 10, generally circular in configuration, as viewed in FIG. 1, in plan, with the silo unloader apparatus generally designated by the numeral 11, being disposed therein, at the bottom thereof, and with a tunnel 12 being illustrated extending beneath the silo 10, beneath the floor thereof.

The tunnel 12 may for example be of hemispherical configuration, as viewed from the right or left ends of the silo illustrated in FIG. 1, and preferably extends through the area beneath the silo 10, also as illustrated in FIG. 1. The floor of the tunnel will thus be generally flat, and the walls and ceiling together forming an inverted U-shaped configuration. The walls of the tunnel 12 are indicated by the numerals 13 and 14 in FIG. 1, and may be of the substantial thickness indicated, in that they will usually be of stone, cement block, brick, or like construction, completely open between the walls 13 and 14 thereof and open at the opposite ends 15 and 16.

Many of the features of the apparatus of this invention are as set forth in my two above-mentioned co-pending applications, and accordingly, the subject matter of those applications is hereby incorporated by reference.

Figure 5:
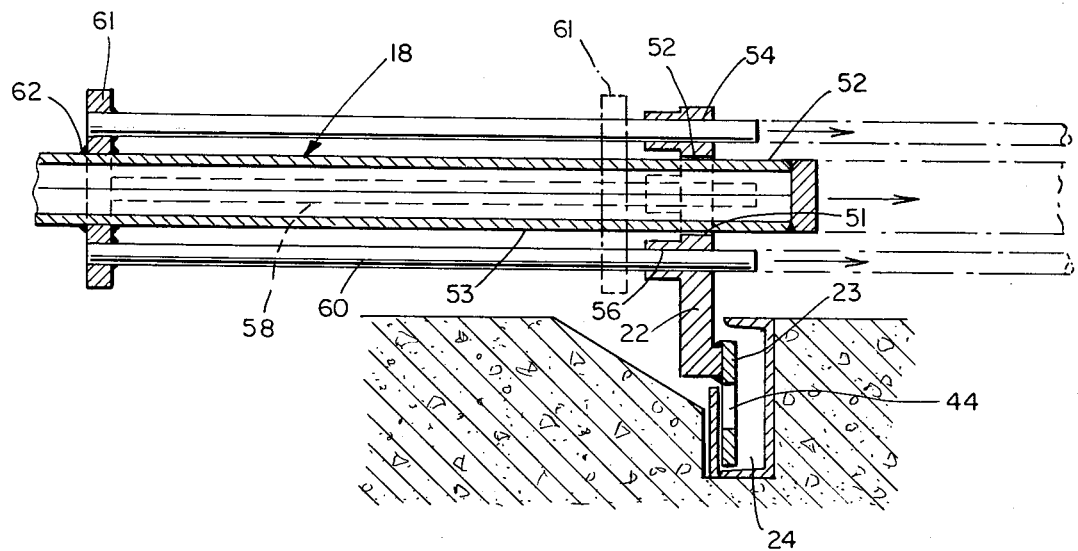
FIG. 5 is a fragmentary longitudinal sectional view, taken through the apparatus illustrated in FIG. 4 generally along the line V—V of FIG. 4, wherein the slidable mounting for the outer end of the auger and its support arm is more clearly illustrated, along with the disposition of the support for the support arm, and its connection to the movable band disposed in the floor.

The auger 17 is provided with a support cam 18, extending generally parallel thereto, and in fact the auger 17 is carried at its outer end by a suitable connection 20. The support arm 18 is generally triangular in cross-sectional configuration as illustrated in FIG. 4, and is carried above the silo floor 21 by an upstanding support 22 that is welded or otherwise suitably connected to a generally circular band 23 disposed within a track 24, as illustrated in FIG. 5. The track 24, band 23, are all of similar construction to their counterparts in the above-mentioned applications, as is the connection of the upstanding support 22 to the band 23.

Figure 3:
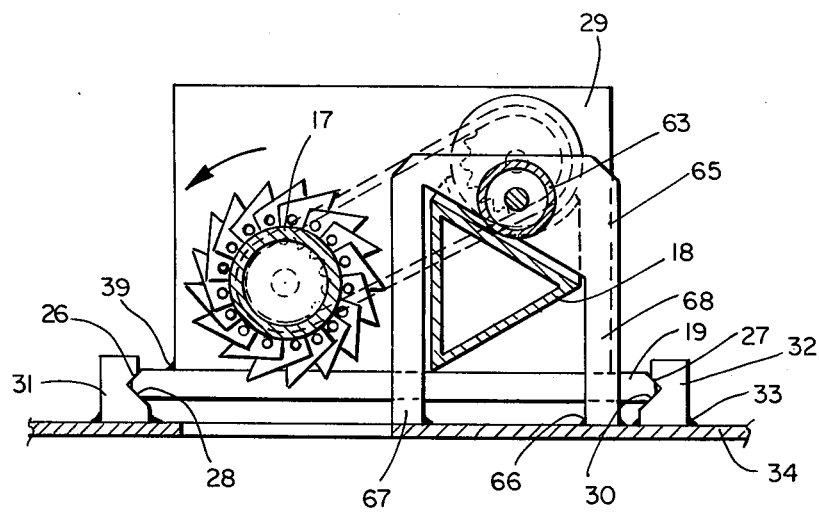
FIG. 3 is a transverse sectional view, taken through the auger and support arm therefor illustrated in FIG. 1, generally along the line III—III of FIG. 1.

The auger 17 and arm 18 are carried at the left-most end as viewed in FIGS. 1 and 3, by any suitable sliding means, such as by a suitable upstanding support 29 as illustrated in FIG. 3, that in turn is carried on a slide plate 19, and welded or otherwise suitably secured thereto as at 39.

The slide plate 19 may be provided with apices on its opposite ends as indicated at 26 and 27 in FIG. 3, that interfit in suitable grooves 28, 30 respectively of vertical support members 31 and 32 that in turn are welded as at 33 onto a generally horizontal plate 34, circular in construction and pivotally or rotationally movable with an inner sleeve 35, relative to outer adjacent sleeve 36 that is firmly secured in a generally circular void 37 in the concrete floor 38.

It will thus be clear that the sleeve 35, with the upper plate 34 welded thereto, is free to slidingly move, or rotate in counter-clockwise and clockwise directions as viewed in FIG. 1, and that the drive that effects this sweeping motion of the auger across the silo floor is provided by movement of the band 23, which provides arcuate movement to the connecting support member 22, and hence to the arm 18 and auger 17, for pivoting or moving them about a generally vertically disposed axis through the approximate center of the circular plate 34, that substantially covers the discharge opening 37. The drive mechanism for driving the band 23 in its track 24 is provided as a cylinder type incremental advance, as for example, as indicated by the numeral 3 in FIG. 1, wherein the advancing (and reversal) type drive mechanism 40 is disposed within the silo 10. The mechanism 40 is generally hydraulic, as disclosed in my above-mentioned patent applications, and includes an advancing cylinder 41, suitably hydraulically connected for operation when a band-engagement 42 operated by a cylinder 43, enters into driving engagement within voids or holes 44 of the band 23, as is fully discussed in the above-mentioned applications.

Figure 2:
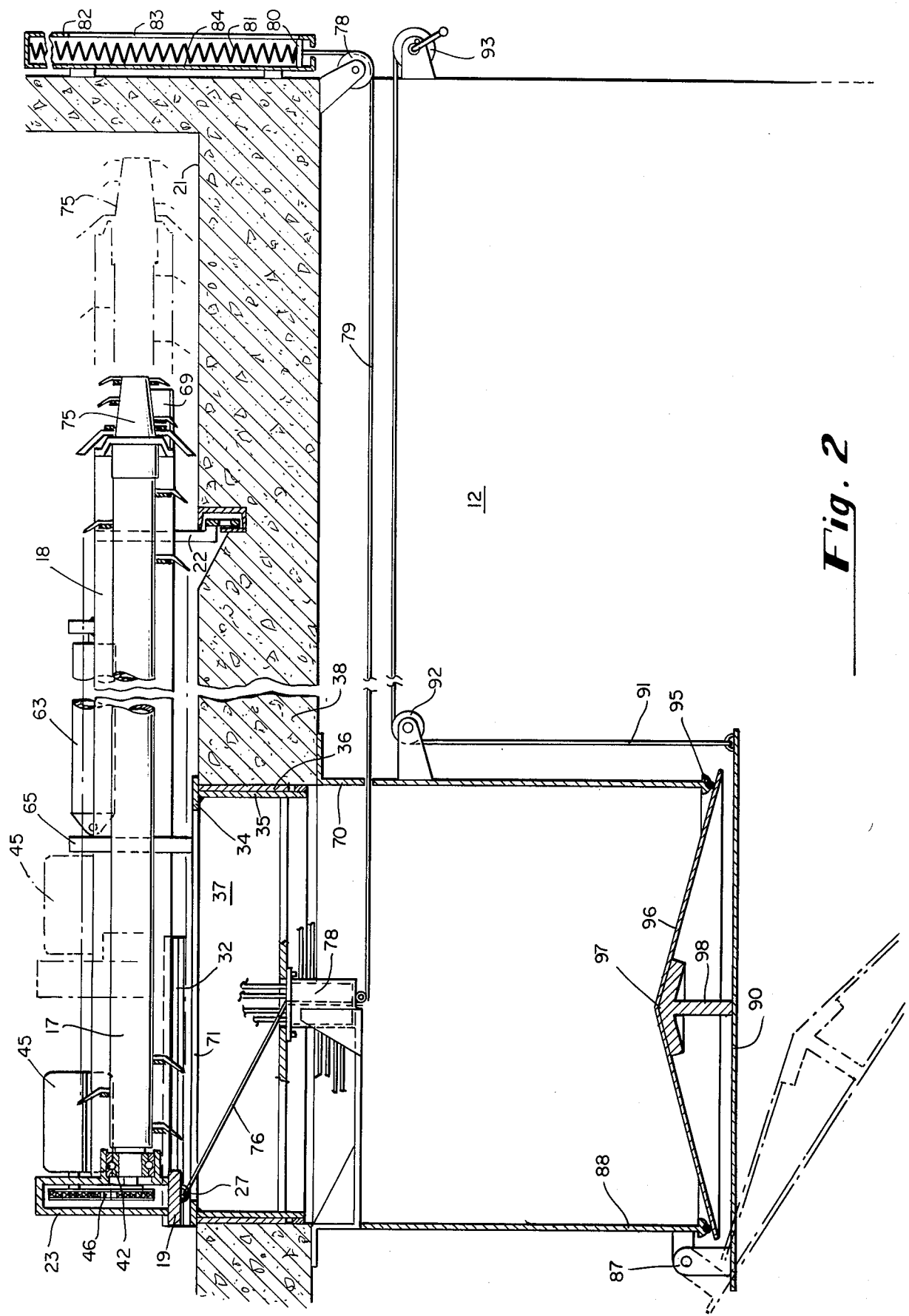

A hydraulic drive or the like is provided, mounted on the arm 18 as indicated in FIG. 1, for movement therewith for providing a turning or rotation of the auger 17 about the generally radial axis of the auger 17, with the drive from the hydraulic motor or the like being provided by a suitable chain drive arrangement 46 or the like encased within the cover provided by the vertical support 29, as illustrated in FIG. 2. Suitable bearings 47, or the like may be provided with the auger 17, for facilitating its rotation about its own axis.

Upon the auger 17 becoming jammed in silage that is difficult to move, such that the auger 17 meets a resistance to its turning about its own axis, a reaction may take place that is transferred by means of the hydraulic system utilized (as is disclosed in the above-mentioned application Ser. No. 283,384,) whereby the advancing or sweeping motion of the auger across the floor of the silo may be slowed or discontinued entirely, until the rotation of the auger 17 about its own axis is sufficient to free the auger 17 from its jammed condition.

The most important part of the apparatus of this invention, that is specific to this application is the provision whereby the auger 17 (and its support arm 18) may move radially inwardly and outwardly toward and away from the silo wall. This is provided by the plate 19 that is slidable within the grooves or recesses 28, 30 at the left-most end of the auger 17, as illustrated in FIG. 1, and by a suitable means for enabling the auger and the support arm on the one hand to slide relative to the member 22 on the other hand, in its radially outward and inward motion. Accordingly, surfaces 50, and 51 may, if desired, be in sliding engagement with corresponding surfaces 52, and 53 of the auger support arm, for facilitating such sliding. Also, for facilitating the sliding, as well as the guiding function, sliding clearance holes 54, 55 and 56 may be provided in a sliding engagement with posts 57, 58 and 60, for a movement of the posts 57, 58 and 60 relative to the member 22, in a direction comparable to that that would appear in the illustration of FIG. 4, to be into and out of the plane of the paper thereof.

The posts 57, 58 and 60 are mounted on a plate 61 that is welded as at 62, to the support arm 18, such that the posts move with the support arm, and relative to the plate 22.

The force for providing the radial outward and inward motion of the auger 17 and support 18 is provided by a hydraulic cylinder 63 that is mounted on arm 18 as illustrated in FIGS. 1, 2 and 3. At the right-most end of the cylinder 63, there is provided a suitable stop 64, for engagement of a piston rod or the like for facilitating the pushing of fluid against a piston or the like carried therein. It will be noted that the cylinder 63 will preferably be of the double-acting type, in order to facilitate both radially outward and inward movement as dictated by the direction and amount of hydraulic fluid or the like delivered thereto. Of course, it will be apparent that other types of cylinders than hydraulic cylinders may be utilized, but that it is believed that hydraulic cylinders would be preferred. The left-most end of the cylinder 63 is engaged with a generally inverted U-shaped member 65, constructed as is best illustrated in FIG. 3, to be fixed relative to the radially outward and inward movement of the auger 17 and support arm 18, in that the plate 65 is welded or otherwise suitably secured, as at 66, to the generally horizontal plate 34, as illustrated in FIG. 3. It will be noted that the plate 65 has depending legs 67 and 68 that straddle the support arm 18, in order not to interfere with the relative radially outward and inward movement thereof.

It will thus be clear that the cylinder 63 (the internal construction of which can be of any suitable type, which will generally have a double-acting piston therein) may push against the plate 65 that is fixedly anchored (with respect to radially outward and inward motion) on the rotatable plate 34, and, upon energizing the cylinder 63, for radial outward movement, the cylinder 63 will push the plates 65 and 64 apart relative to each other, to move the auger 17 and its arm 18 radially outwardly (together) from the full line position to the phantom line position thereof illustrated in FIG. 2 wherein the outer end of the auger 17 is disposed most closely adjacent the silo wall. Of course, the left-most end of the auger and support arm, and the motor 45 as well as the upstanding support 23 and the slide 19 also move from the full line position to the phantom position illustrated therefor, during such movement. It will be noted that even when the auger is in the phantom line position illustrated in FIG. 2, for example, the left-most end of the auger 17 thereof is still in a position disposed over the open upper end 37 of the discharge duct 70, for delivering silage from an opening 71, in the plate 34, as illustrated in FIG. 3. It will be noted that the opening 71, extends generally across the width of the sleeve 35, or plate 34 as illustrated in FIG. 2 but width-wise as illustrated in FIG. 3, is about the same width as the diameter of the auger 17. By so limiting the size of the opening 71 so that when silage gradually drops downwardly onto the auger, it will not be able to fill the discharge opening 37, or at least not be able to fill the duct 70, and accordingly, compaction of silage resulting from sitting overnight within the duct 71 will not normally be effected, in that the bottom end of the duct 70 may be opened at the time of shut down as will be explained more fully hereinafter and then closed for overnight securement.

It will further be apparent, that the cylinder 63 will be actuated in a manner reverse to that described above, when it is desired to move the outer end of the auger 17 away from the silo wall.

Even further just as it has been described above and is described more thoroughly in application Ser. No. 283,384, mentioned above, with respect to the desirability of having hydraulic connections and arrangements, such that excessive resistance encountered by the auger 17 during its rotation may effect an interruption of the forward advance of the auger in its sweeping motion across the floor, so in a similar manner, there may be utilized an arrangement whereby as the auger 17 meets resistance in its advance in accordance with the present invention, wherein such resistance is attendant to engagement of silage with the outer-most end of the auger 17 that may attempt to jam the auger or inhibit its operations, such resistance may be felt by the hydraulic system in such a way that it could actuate the cylinder 63, by directing hydraulic fluid thereto in such a manner, or otherwise, that the cylinder 63 can cause retraction, or radially inward translation of position for the auger 17, away from the packed silage at the silo wall, an amount sufficient that the resistance met by the auger 17 in its rotation and advance will be reduced, permitting an advancing of the auger 17 along with its rotation at a normal rate.

It will also be noted, that the outer end of the auger 17 may be of a tapered construction, as illustrated for the outer end 75 of the auger 17, along with an extended back portion, wiper or shield 69 of the type described in my applications mentioned above. However, the outer end 75 of the auger 17 will not normally be a separable, auxiliary auger, or if such is an auxiliary auger, such may be permanently disposed on the end of the main auger 17 as desired, not requiring periodic changes when it is desired to cut silage more closely adjacent the inner wall of the silo.

It will be apparent that it will be desired to have some method of monitoring the precise location of the outer end of the auger 17 at any given time. A cable 76 may be provided, connected to the plate 19 as at 77, with the cable 76 passing through the swivel member 78 (similar to that swivel member at a comparable location in the above-mentioned patent applications), and with a cable connection therefor 79 passing through the tunnel beneath the silo, around a pulley 78 or the like to an indicator 80. The indicator 80 is spring-urged upwardly by a suitable helical extension 81 or the like within a casing 82, with a window 83 being provided whereby the placement of the member 80 on a calibrated chart or the like, (not shown but on the back wall) may indicate a given numerical value corresponding to a position for the outer-most end of the auger, and its spacing relative to the silo wall, at a given time.

As has been set forth above, the discharge from the chute for silage delivered through the central opening 71 into the chute 70 may be controlled, in accordance with this invention. Many times, principally, during shut down, it will be desired to have the silo closed to keep oxygen from penetrating the silo and spoiling the feed and against access by animals, such as vermine or the like that would otherwise endeavor to get at the silage. Considering that the discharge 70 is between the silo itself and a tunnel 12 disposed therebeneath, in accordance with the present invention, a shut-off arrangement is provided in the form of a bottom closure. The use of a bottom closure retains any silage that falls into the chute, within the chute when the closure is "closed" and prevents flooding of silage onto and into a conveyor disposed therebeneath, in the tunnel. On the left end of the chute 70 or duct 70 a hinge 87 is provided, of a pin or other conventional type, between the wall 88 and a bottom plate 90. A cable 91 connects the right-most end of the plate 90 as illustrated in FIG. 2, over a bracket mounted pulley 92 disposed along another wall of the chute 70, with the cable 91 then passing around a hand crank 93 or the like, outside the silo, for manual actuation (or even automatic actuation if desired), by the user of the silo. By simply cranking the device 93 the closure plate 90 will be lowered for example, from the full line position illustrated in FIG. 2, to its phantom line position illustrated in FIG. 2, pivoting about the pin or comparable member provided by the hinge 87. The lower-most end of the chute 70 may be provided with a rubber ring 95 or the like, for effecting a sealing engagement against the upper surface of a preferably conically configured member 96 centrally mounted on the head 97 (that is circular in plan view) and that has a spacer 98 connecting it to the upper surface of the plate 90. It will thus be apparent that the periphery of the conical member 96 because of its mounting, has a certain resilience, that cooperates in spring-like fashion with the ring 95 at the lower end of the duct 70, to effect a tight sealing engagement, as desired. The conical configuration facilitates spring-like action and doesn't lend itself to buckling as would a flat plate type closure. It will also be apparent, that, in plan view, the duct 70 will preferably be circular as well as the cone 96 and plate 90, etc. However, it will be apparent that such could be rectangular in cross-section as viewed in plan.

It will be apparent that various modifications may be made in the apparatus, details thereof, and method of using the same, all within the spirit and scope of the invention, as defined in the appended claims.

What is claimed is:

1. Apparatus for use in unloading a silo from the bottom thereof through a generally central opening therein, comprising an auger for generally radial disposition at the bottom of a silo above the floor thereof, the auger having cutting means thereon for cutting silage and conveying silage radially inwardly toward the opening, means for mounting the auger at the central opening for pivotal movement as the auger sweeps in an arc generally parallel to the floor of the silo about a generally central sweep axis, means for moving the auger in its arcuate sweeping motion, means for drivingly rotating the auger about its own generally radial axis, and selectively operable power means operatively associated with said auger for varying the distance of placement of the auger from a silo wall along a generally radial line from the general center of the silo during the operation of said cutting means and without interrupting the operation of the apparatus, for controlling the proximity of cutting of silage relative to the silo wall.

2. The apparatus of claim 1, wherein said power means comprises a drive mechanism for mounting inside a silo.

3. The apparatus of claim 1, wherein the auger is disposed in a silo and including means supporting the auger at radially spaced apart locations along the silo floor, with said latter means including slide means for facilitating the radial movement of the auger.

4. The apparatus of claim 1, wherein the auger is disposed within a silo and wherein said means for moving the auger in its arcuate sweeping motion includes a generally circular integral band disposed at the bottom of the silo in generally concentric disposition with the center of the silo, said band being movably disposed for movement of the band about its own generally vertical axis, means for driving said band in its movement, and connecting support means in supporting relation between said band and a radial outer portion of said auger.

5. The apparatus of claim 1, wherein an auger support arm is provided for disposition generally parallel to said auger, and for mounting at the central opening for pivotal movement thereabout with said auger, and with said arm being connected to said auger for radial movement of the auger with respect thereto, and with said arm being connected to said auger for longitudinal movement therewith with respect to the radial axis of said auger.

6. The apparatus of claim 5, wherein the auger is disposed within a silo, and wherein said means for moving the auger in its arcuate sweeping motion includes a generally circular band disposed at the bottom of the silo in generally concentric disposition with the center of the silo, said band being movably disposed for movement of the band about its own generally vertical axis, means for driving said band in its movement, and connecting support means in supporting relation between said band and a radial outer portion of said auger, wherein the connecting support means is connected to said auger through said arm and wherein said connecting support means is in slidable relation with said arm.

7. The apparatus of claim 5, including slide means mounting said auger and arm at radial inner portions thereof, substantially at the central opening, comprising means supporting the radial inner ends thereof in sliding relation to the silo floor.

8. The apparatus of claim 1, wherein said auger is disposed in a silo.

9. The apparatus of claim 8, wherein indication means are provided for giving an indication of the radial position of the auger relative to the interior of the silo wall.

10. The apparatus of claim 9, wherein said indication means is of the constant monitor type.

11. The apparatus of claim 10, wherein said indicator means is physically connected to a radial inner portion of said auger by a cable-like member.

12. Apparatus for use in unloading a silo from the bottom thereof through a generally central opening therein, comprising an auger for generally radial disposition at the bottom of the silo above the floor thereof, the auger having cutting means thereon for cutting silage and conveying silage radially inwardly towards the opening, means for mounting the auger at the central opening for pivotal movement as the auger sweeps in an arc generally parallel to the floor of the silo about a generally central sweep axis, means for moving the auger in its arcuate sweeping motion, means for drivingly rotating the auger about its own generally radial axis, including selectively operable power means operatively associated with said auger for varying the position of the radial outermost end of the auger continuously in relation to the silo wall during the operation of said cutting means and without interrupting the operation of the apparatus, for controlling the proximity of cutting of silage relative to the silo wall.

13. Apparatus for use in unloading a silo from the bottom thereof through a generally central opening therein, comprising an auger for generally radial disposition at the bottom of a silo above the floor thereof, the auger having cutting means thereon for cutting silage and conveying silage directly inwardly toward the opening, means for mounting the auger at the central opening for pivotal movement as the auger sweeps in an arc generally parallel to the floor of the silo about a generally central sweep axis, means for moving the auger in its arcuate sweeping motion, means for drivingly rotating the auger about its own generally radial axis, and means for selectively varying the distance of placement of the auger from a silo wall along a generally radial line from the general center of the silo, for controlling the proximity of the cutting of silage relative to the silo wall, and wherein the auger is disposed in said silo, and wherein said means for moving the auger in its arcuate sweeping motion includes a generally circular band disposed at the bottom of the silo in generally concentric dispositon with the center of the silo, said band being movably disposed from movement of the band about its own generally vertical axis, means for driving said band in its movement, and connecting support means in supporting relation between said band and a radial outer portion of said auger, wherein the connecting support means is connected to said auger through said arm and wherein said connecting support means is in slidable relationship with said arm, and wherein said connecting support means comprises a generally upstanding plate, with a plurality of voids therein, and with a plurality of slide members fixedly carried by said arm for sliding engagement through said voids.

14. The apparatus of claim 13, including a drive mechanism of the cylinder type carried by said arm, inside said silo.

15. Apparatus for use in unloading a silo from the bottom thereof through a generally central opening therein, comprising an auger for generally radial disposition at the bottom of a silo above the floor thereof, the auger having cutting means thereon for cutting silage and conveying silage radially inward toward the opening, means for mounting the auger at the central opening for pivotal movement as the auger sweeps in an arc generally parallel to the floor of the silo about a generally central sweep axis, means for moving the auger in its arcuate sweeping motion, means for drivingly rotating the auger about its own general radial axis, and means for selectively varying the distance of placement of the auger from a silo wall along a generally radial line from the general center of the silo, for controlling the proximity of cutting of silage relative to the silo wall, and wherein an auger arm is provided for disposition generally parallel to said auger, and for mounting at the central opening for pivotal movement thereabout with said auger, and with said arm being connected to said auger for radial movement therewith, said apparatus including slide means mounting said auger and arm at radial inner portions thereof, substantially at the central opening, comprising means supporting the radial inner ends thereof in sliding relation to the silo floor, and wherein the auger is disposed in a silo, and wherein said means for moving the auger in its arcuate sweeping motion includes a generally circular band disposed at the bottom of the silo in generally concentric disposition with the center of the silo, said band being movably disposed for movement of the band about its own generally vertical axis, means for driving said band in its movement, and connecting supporting means in supporting relation between said band and the radial outer portion of said auger, wherein the connecting support means is connected to said auger through said arm and wherein said connecting support means is in slidable relationship with said arm, wherein said connecting support means comprises a generally upstanding plate with a plurality of voids therein, and with a plurality of slide members fixedly carried by said arm for sliding movement through said voids, and including a drive mechanism of a cylinder type carried by said arm, inside said silo.

* * * * *